Aug. 18, 1970          G. E. BARTLETT          3,524,309

GOLF GREENS MOWER

Filed Aug. 20, 1968          2 Sheets-Sheet 1

INVENTOR.
GORDON E. BARTLETT
BY
Burd, MacEachron, Braddock,
Bartz & Schwartz
ATTORNEYS

INVENTOR.
GORDON E. BARTLETT

United States Patent Office 3,524,309
Patented Aug. 18, 1970

3,524,309
GOLF GREENS MOWER
Gordon E. Bartlett, 1604½ Laurel Ave.,
Eau Claire, Wis. 54701
Filed Aug. 20, 1968, Ser. No. 754,066
Int. Cl. A01d 55/20
U.S. Cl. 56—249
10 Claims

ABSTRACT OF THE DISCLOSURE

A precision grass mower of the reel type having a forwardly disposed ground engaging roller for cutting golf greens at a precisely predetermined height. The mower is provided with shifting means for moving the height adjusting roller to either of two positions for cutting the grass of the green and the collar surrounding the green at different but precisely determined heights.

---

This invention relates to a precision two-step cutting adjustment for a reel type of lawn mower, such as is employed in mowing the putting greens and collars surrounding the putting greens of golf courses and similar uses where the finest and most accurate type of mowing is required. As is well known, the grass on golf putting greens is thick and is maintained closely cropped. In most instances, this requires almost daily mowing. The greens mower is a precision instrument for accurage close mowing of the grass.

Most greenskeepers prefer for the collar grass surrounding the putting green for a disance of two or three mower widths to be precisely and accurately cut, but at a height slightly greater than that of the putting green, such as ¼ to ½ inch greater. Because of the precision adjustment of the cutting height of both putting green and collar mowers, adjustment of the cutting height on the course so as to mow both putting green and collar with the same mower has not heretofore been feasible. Accordingly, two mowers have been required, each with its own precision height adjustment. Each golf course has been faced with the alternatives of having a less than ideal playing surface or the added expense of maintaining an extra mower for cutting the collars of putting greens.

The existing putting green mower in widespread use includes a reel and bed plate, a rearwardly disposed ground engaging wheel or drum and a forwardly disposed adjustable ground engaging roller which is included and disposed for permitting the most accurate mowing known today. The mower of the present invention requires only a minimum of alteration and addition to the existing golf greens mower to provide for accurate mowing at either of two precisely determined heights. The mower is provided with shifting means for moving the height adjusting roller to either of two positions for cutting the grass of the putting green and the collar surrounding the green at two different but precisely determined heights. This permits a single mower to perform the precise mowing functions heretofore requiring two different mowers.

The invention is illustrated in the accompanying drawings in which.

Figure 1:
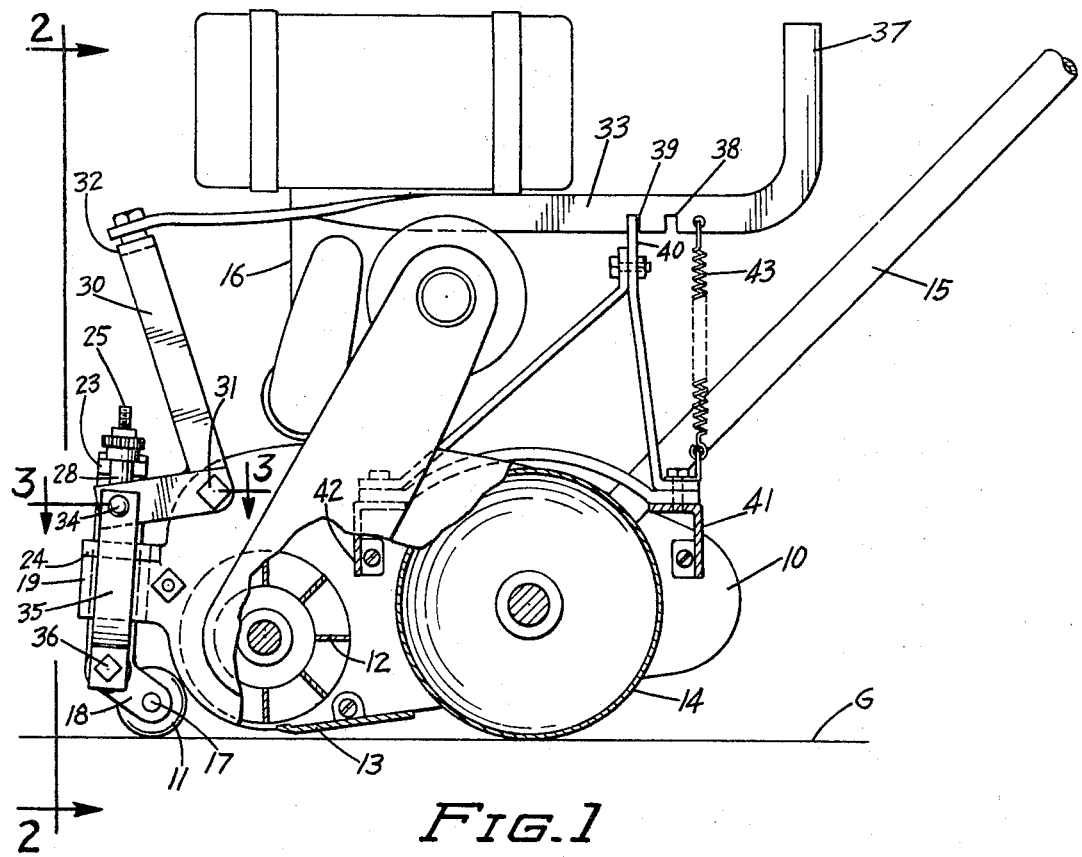
FIG. 1 is a fragmentary side elevation, partly in section, of a greens mower according to the present invention.
Figure 3:
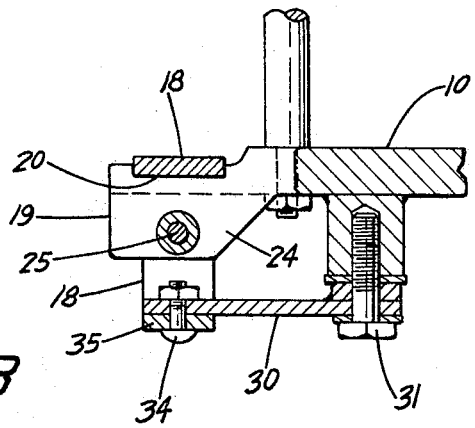
FIG. 3 is a fragmentary horizontal section on an enlarged scale on the line 3—3 of FIG. 1 and in the direction of the arrows.
Figure 2:
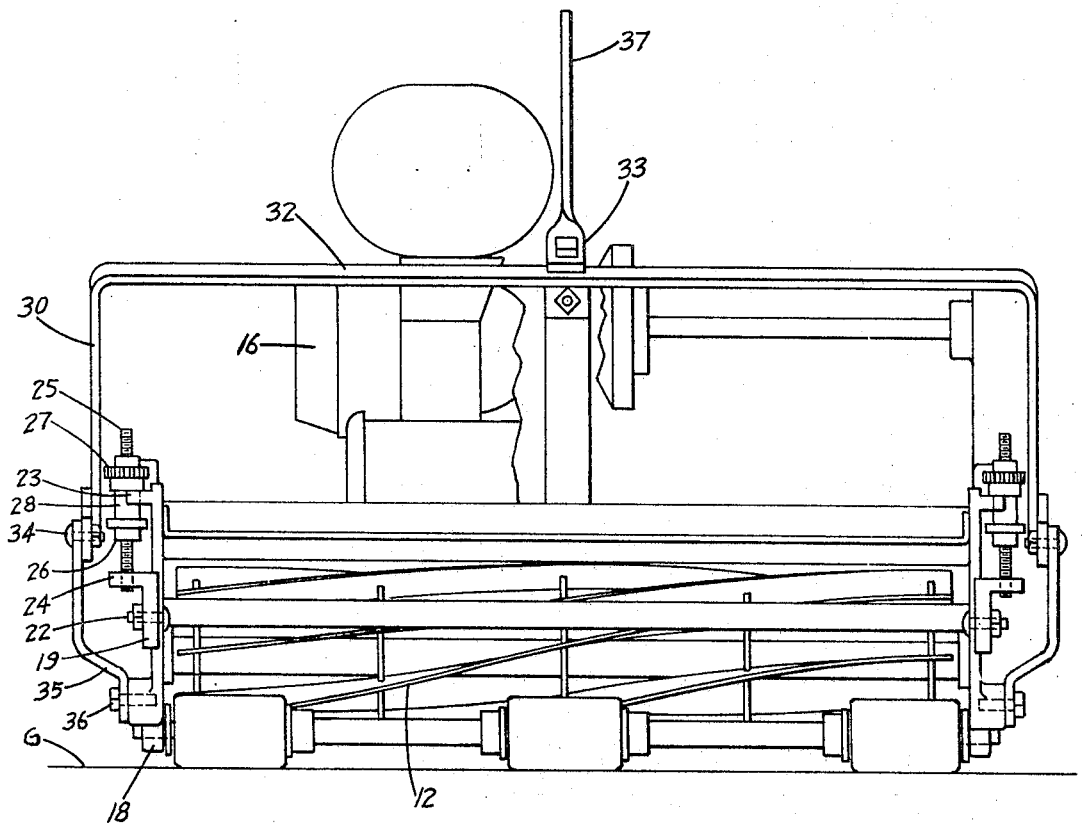
FIG. 2 is a fragmentary front elevation of the greens mower.

In the drawings, the same reference numerals refer to corresponding parts. The mower includes a pair of spaced apart side plates or frame members 10 which support a forwardly disposed ground engaging roller 11, grass cutting reel 12, bed plate 13 and a ground engaging drum or wheel 14. The ground line is indicated as G. It will be understood that the roller 11 and drum 14 roll on the ground G when the mower is in operating position for the reel 12 to cut the grass through engagement of the blades of the reel against the forward knife-edge of the bed plate 13. As illustrated, the forwardly disposed roller 11 is shown as comprised of several roller segments. Alternatively, it may be formed in one piece.

Apart from the manner in which the forwardly disposed roller 11 is mounted for adjustment, as described in detail hereinafter, the elements described are held in common with the putting greens mower in widespread use today. That conventional mower also includes a handle 15 for pushing and/or guiding the mower in its operation. Handle 15 is provided with the brackets whose forward ends are pivotally secured to the side plates in the usual manner providing for limited rotational movement of the handle about its pivot points. A suitable motor 16, which may be an internal combustion engine of any suitable construction, is mounted on the mower frame and connected through suitable drive means to propel the reel 12 in its mowing operation, as is well understood.

Figure 4:
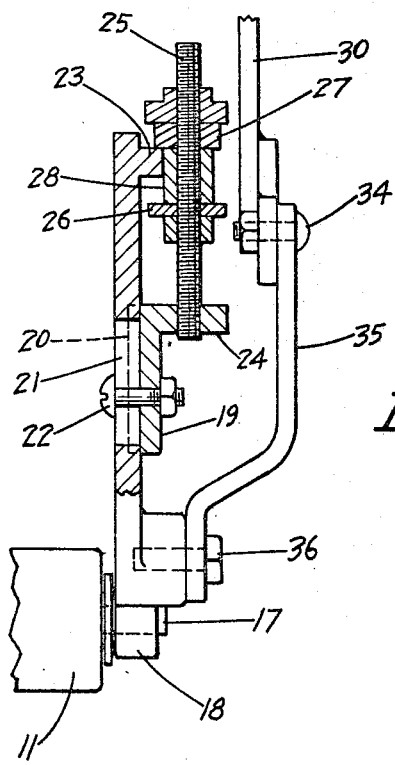
FIG. 4 is a fragmentary detail elevation, partly in section, of the height adjustment means.

Forwardly disposed roller 11 (whether in one piece or in segments as illustrated) is journaled for rotation on a horizontal shaft 17 whose opposite ends are carried in a pair of vertically slidable standards 18 mounted in the forward ends 19 of the frame or side plates 10. Standards 18 are engaged in generally vertical channels or grooves 20 on the inwardly facing surfaces of the forward ends 19 of side plates 10. Each standard has a vertically extending slot 21 (FIG. 4) for receiving the shank of a bolt 22 extending through the side plate. In the conventional greens mower this bolt is used to clamp the standard 18 in its selected elevated position. In the present construction the bolt 22 serves only as a retainer for standard 18 in its vertically sliding movement between either of two predetermined positions.

The upper end of each standard 18 has an angularly outwardly extending bifurcated portion 23 by means of which the two alternating positions of forwardly positioned ground engaging roller 11 are determined. The forward end 19 of each side plate 10 also has an angularly outwardly projecting portion 24 to which is fixed a threaded shaft or stud 25 which extends between the arms of the bifurcated portion 23 of standard 18.

A lower stop means 26 is fixed to stud 25 between the supporting projection 24 and the bifurcated portion 23 of the standard. An upper stop means 27 is disposed on the stud 25 above the bifurcated portion of the standard. Both stop means 26 and 27 are preferably in the form of pairs of threaded collars or nuts which may be adjustably positioned with respect to the threaded stud but may be firmly fixed in place when the adjustment to the predetermined mowing height is made. The stop means are precisely spaced apart by means of a collar or sleeve or a U-shaped spacer 28 which fits between the arms of the bifurcated portion 23 of the standard and whose depth is related to the difference, such as $\frac{5}{16}$ inch, in mowing height between the putting green and collar.

When the forwardly disposed ground engaging roller 11 of the mower is adjusted for mowing of the putting green, as illustrated, the upper surface of the bifurcated portion 23 of the standard 18 bears against the lower surface of the upper stop means 27. The stop means remain fixed in place. When the roller 11 is in position for mowing the greens collar, the lower surface of the bifurcated member 23 engages the upper surface of lower stop means 26.

The roller 11 is shifted between these two positions by means of shifting mechanism to be described.

A bell crank member 30, or other suitable eccentric means, is pivotally attached at 31 to each of the side plates 10. The bell crank members on opposite sides of the mower are interconnected by a horizontal cross bar 32 to which an operating lever 33 is rigidly attached. The free end of each bell crank member 30 is pivotally attached at 34 to a vertically extending link 35 which is secured at 36 to standard 18 supporting the forwardly disclosed ground engaging roller 11.

Operating lever 33 is provided with a handle 37 within easy reach of the operator for shifting the mower from putting green cutting height to collar cutting height and vice versa. To secure the operating mechanism in either of these positions a pair of locking notches 38 and 39 are positioned in the bottom edge of operating lever 33. Depending upon the desired mowing height, the operating lever 33 is moved by means of handle 37 so that either slot 38 or 39 is engaged by a vertically projecting tongue 40 rigidly supported from a pair of horizontal cross members 41 and 42 extending transversely of the mower. Operating lever 33 is spring loaded by means of coil spring 43 to hold one of the locking notches 38 or 39 in engagement with locking tongue 40.

When it is desired to change the mowing height the operator need only grasp handle 37 and lift the operating lever 33 against the tension of spring 43 to release the locking notch from engagement with the locking tongue. Then the lever is pushed forward or backwards, depending upon the direction of mowing height adjustment, and the locking tongue 40 is re-engaged by the other of the locking notches and held there by means of frictional engagement assisted by tension of spring 43.

The movement of the operating lever is transmitted through cross bar 32 to the bell crank members 30 which rotate on their points of pivotal attachment 31 to the side plates of the mower. As the free ends of the bell crank members are moved up or down, this vertical movement is transmitted through links 35 to the standards 18 to raise or lower the ground engaging forwardly disposed roller 11. The stop members 26 and 27 engaging the bifurcated upper end 23 of the standards 18 determine the upper and lower positions of the standards. These locations are precisely and accurately predetermined by positioning of the stop members in the factory or shop according to the preferences and desires of the greenskeeper. No adjustment of the cutting height, apart from the predetermined putting green and collar cutting heights, is necessary or desirable out on the course.

It is apparent that many modifications and variations of this invention as hereinbefore set forth may be made without departing from the spirit and scope thereof. The specific embodiments described are given by way of example only and the invention is limited only by the terms of the appended claims.

I claim:

1. In a lawn mower of the type for cutting putting greens including a frame supporting a cutting reel and a bed knife and rotary ground engaging means disposed forwardly and rearwardly of the reel, a cutting height adjustment comprising:
   (A) a horizontally spaced apart pair of standards slidably movable in a generally vertical direction and disposed on opposite sides of the frame of said lawn mower,
   (B) said forwardly disposed rotary ground engaging means being supported between the lower ends of said standards,
   (C) a pair of fixed generally vertically spaced apart stop means on at least one side of the frame of said lawn mower,
   (D) positioning means fixed to and projecting from the upper end of at least one of said standards on the same side of the mower as said stop means,
   (E) said positioning means being reciprocable with said standard into engagement with one or the other of said stop means, and
   (F) shifting means operatively connected to said standards to reciprocate the standards between either of two positions as determined by engagement of said positioning means with one or the other of said stop means.

2. A mower according to claim 1 further characterized in that said stop means, while fixed, are adjustable.

3. A mower according to claim 2 further characterized in that said adjustable stop means comprise threaded collar means having upper and lower stop surfaces and supported on a threaded stud mounted on the frame of the mower.

4. A mower according to claim 3 further characterized in that said positioning means fixed to said standard is bifurcated, the arms thereof extending on opposite sides of said threaded stud, said positioning means having spaced apart upper and lower surfaces each positioned to engage one of said stop surfaces.

5. A mower according to claim 3 further characterized in that said adjustable stop means comprises a pair of threaded collars held spaced apart by means of a spacer embracing said stud and related in height to the differences in cutting heights to which the mower is adjustable.

6. A mower according to claim 1 further characterized in that each of said standards is provided with positioning means and spaced apart stop means are provided on the frame on both sides of said mower.

7. A mower according to claim 1 further characterized in that said shifting means comprises at least one bell crank pivotally attached to the frame of the mower on one side, an operating lever and handle connected to one arm of said bell crank and a link secured to said standard on the same side of said frame and pivotally connected to the other arm of said bell crank.

8. A mower according to claim 7 further characterized in that said shifting means comprises a pair of interconnected bell cranks each connected through a pivotally attached link to one standard and operable together by a single operating lever and handle.

9. A mower according to claim 7 further characterized in that said operating lever is provided with locking means for securing said lever and said forwardly disposed rotary ground engaging means controlled thereby in either of two positions.

10. A mower according to claim 1 further characterized in that said forwardly disposed rotary ground engaging means is a roller supported on a shaft carried between the ends of said spaced apart standards.

References Cited

UNITED STATES PATENTS

| | | | |
|---|---|---|---|
| 644,793 | 3/1900 | Coldwell | 56—252 |
| 1,538,381 | 5/1925 | Bull | 56—26 XR |
| 2,032,784 | 3/1936 | Worthington | 56—249 XR |
| 2,329,383 | 9/1943 | Bly | 56—252 |
| 2,968,906 | 1/1961 | Grimes | 56—249 |
| 2,972,218 | 2/1961 | Benson | 56—26 |

RUSSELL R. KINSEY, Primary Examiner

U.S. Cl. X.R.

56—26